UNITED STATES PATENT OFFICE.

ERNEST HOPKINSON, OF NEW YORK, N. Y., ASSIGNOR TO GENERAL RUBBER COMPANY, A CORPORATION OF NEW JERSEY.

PRODUCT OBTAINED FROM RUBBER-CONTAINING LATEX.

1,423,526.            Specification of Letters Patent.     Patented July 25, 1922.

No Drawing.      Application filed January 16, 1920. Serial No. 351,946.

*To all whom it may concern:*

Be it known that I, ERNEST HOPKINSON, a citizen of the United States, residing at New York city, county and State of New York, have invented new and useful Improvements in Products Obtained from Rubber-Containing Latex, of which the following is a full, clear, and exact description.

This invention relates to products derived from rubber-containing latex. It is more particularly directed to such products derived by spraying latex or the like.

By far the greater portion of rubber used at the present time is obtained from the latex of the *Hevea brasiliensis*, this being the tree from which most of the rubber gathered on the Amazon and its tributaries is obtained, and is also the tree which is most exclusively cultivated in Ceylon, Federated Malay States, Straits Settlements, Sumatra and other parts of the East. At the present time all the rubber from this latex is coagulated. In Brazil the method consists of collecting the latex from the trees and immediately proceeding with the coagulation of the same, which is effected by dipping a paddle in the latex, and then holding the paddle with the layer of adhering latex over the smoke of a fire made of urucuri nuts, which give off fumes having astringent properties thereby coagulating the latex. The paddle is repeatedly and alternately dipped and held over the fire, so that a mass of coagulated rubber is built up on it in layer formation. On the plantations in the East the process of coagulation consists of collecting the latex and immediately proceeding to the coagulation process by adding acetic acid or some similar chemical to the latex and stirring the same until a coagulum is formed, which consists of a spongy mass separated out of the latex and having generally the characteristics of curds separated from milk. Another process is to permit the latex to stand in a warm atmosphere, which brings about what is called natural coagulation. After the coagulum is formed, whether by the first or second process, it is taken out of the residual fluid and passed through rolls to squeeze out the contained fluid, and is then dried, when it is ready for shipment to the factories manufacturing rubber goods. In these processes just recited, in the case of the method employing smoke used in South America and in the case of the acetic acid coagulation, there are contained in the product finally obtained one or more chemical constituents (smoke products, acetic acid, etc.) which are undesirable and, to some extent, injurious.

In all the processes just recited, it is impossible to obtain all the solid contents of the latex, and these solid contents are all of importance in the subsequent manipulation and vulcanization of the rubber obtained. The solid contents of the latex comprise the "caoutchouc" or rubber globules, resins and proteins, both soluble and insoluble in water.

One of the objects of the present invention accordingly, is to provide a product which shall do away with the disadvantages noted in connection with the products of processes heretofore proposed. Another object is to provide a product which shall have improved physical characteristics, particularly increased tensile strength and resistance to wear. Another object is to provide a product in which substantially all of the solid natural constituents of the latex are obtained so that there is a substantial increase in the amount of rubber obtained from the same quantity of latex. Another object is to provide a product combining vulcanizing and compounding ingredients in a more homogeneous manner than heretofore secured with crude rubber without the destructive effect of mixing and grinding the rubber and the compounding ingredients between hot rolls. Another object of the invention is to provide a homogeneous product containing ingredients which would normally tend to prevent homogeneity.

These objects are secured, broadly speaking, by preventing the coagulation of the latex by the addition of basic material, preferably ammonia, and spraying the latex in a water-absorbing gaseous medium, such as heated air. By the present improvement, all the solid contents of the rubber latex are obtained in the finished product, so that there is an increased yield from the latex of, roughly, three per cent based on the latex, or approximately ten per cent based on the rubber, the average latex containing solid constituents which vary, roughly, from about twenty-seven to forty per cent. These increased solid constituents aid in vulcanization and improve the physical characteristics of the vulcanized rubber consequently. The solid contents of the latex are obtained from a process which drives off the water practically instantaneously, so that these solids undergo no chemical change, and moreover, as obtained, do not contain any added chemicals. It is true that others have suggested the spraying of rubber latex but, so far as I am aware, such spraying operations have always been used in connection with coagulating material, such as smoke or acetic acid or similar coagulating chemical. They have not had for their object the avoidance of chemical coagulation nor the object of obtaining the entire solid contents in the form and in the manner in which they are obtained by the present method. By the present method, not only is the yield increased, but the quality of the rubber so obtained is materially improved, the tensile strength being increased by about twenty per cent, which may be attributed not only to the fact that there is present in the rubber all the solid contents of the latex, but also the fact that these solid contents have not been subjected to any milling operation as part of the coagulating process.

This application corresponds to application Serial Number 351,945, filed January 16, 1920. This application is a continuation in part of application Serial No. 326,276, filed September 25, 1919.

In carrying out the process for the production of a crude rubber such as described, rubber-containing latex is treated upon collection of the latex from the trees with a preservative material adapted to prevent coagulation. Where only spontaneous coagulation which normally occurs upon standing of the latex is to be prevented, ammonia or similar substances may be added. If coagulation, induced by addition of substances such as vulcanizing agents or other compounding ingredients, particularly adsorptive substances, is to be prevented, saponin, glycerine or glue or similar material may be added. Such material should be preferably mixed with the vulcanizing agent or compounding ingredient before addition thereof to the latex. For prevention of spontaneous coagulation, 0.1% of ammonia may be added to the latex. To prevent coagulation by vulcanizing agents and other compounding ingredients, 0.1% of saponin may be added.

The latex and ammonia or latex and vulcanizing and compounding ingredients plus saponin are placed in a tank and constantly agitated. While undergoing agitation, the latex is delivered in a uniform stream to an air jet and projected in a stream of finely divided particles. The spray delivers the finely atomized material into a chamber and the spray of atomized latex meets a second stream of drying gas, preferably heated air although any other gas such as carbon dioxide or the gaseous products of combustion may be employed. The gas is heated preferably approximately to 200° F. and if heated air is employed, the humidity may be that of the atmosphere. The air serves as a drying and conveying medium for the fine particles passing from the sprays, and its temperature drops upon being joined by the stream of latex from approximately 200° F. to approximately 130° F. Higher temperatures than 200° F. may be employed if desired. Temperatures of 600° F. and higher have been satisfactorily used. The air absorbs moisture from the latex, its own humidity increasing to approximately the extent of the absorption. Deposition of the heated sprayed particles, which are dried by the action of the drying gas, from the stream of moistened heated air, begins to occur in appreciable quantity at the first abrupt changing of the gas stream. The deposition continues while the mixture is being guided through a tortuous channel. The deposition of the particles is finally completely effected in spiral collectors, the separation being effected by centrifugal action throwing the mass of particles to the surrounding walls of these chambers.

The fluid content of the latex may be altered to any desired extent by spraying. If desired, a rubber or similar material may be obtained containing 0.6% moisture or less. Rubber containing a small content of moisture as 0.6% so produced, appears within the chamber or other collecting area as a flocculent fluffy mass resembling in appearance bits of cotton waste. These particles tend to cohere, and when taken from the chamber appear in lumps of varying sizes. The following description is given of a product from latex obtained from *Hevea brasiliensis*, grown in Sumatra, Dutch East Indies, and treated with ammonia to prevent spontaneous coagulation:—

The product is an unvulcanized spongy mass of rubber consisting of cohering particles and is white in color. It is frangible and may be readily broken apart with the fingers. It is relatively plastic at ordinary temperatures and retains its plasticity until compressed to form crude rubber as indicated below. Upon being squeezed in the hand the sensation is similar to that arising when snow is similarly compacted. As collected from the chamber, the gavimetric density has been found to be 0.30–0.40 at 70° F.

The term "spongy" as employed in the specification and claims is intended to designate a porous compressible structure having an imbibitory character, but differing in its elasticity from that of an ordinary vegetable sponge which when compressed tends to return to its original structure, preserving its pores, while the sponge obtained by the present process loses its pores upon compression and consolidates. The pressed mass of the present process, as pointed out below, assumes the usual physical properties of crude rubber in a superior degree.

In order to form this spongy product into a crude rubber mass, it is placed in a hydraulic or other press or passed between pressure rolls and compacted. The air cavities thereupon disappear, the particles cohering and assuming the general characteristics of crude rubber. Of course this compacting process need not be a separate step solely for the purpose of compacting, as it will be obvious that this compacting may be effected in any necessary milling or calendering operation incident to the manufacture of vulcanized rubber articles or the compacting, in some cases, may be effected in the pressure mold.

The compression of this spongy product effects its change into crude rubber. As pointed out, the spongy mass may be readily broken apart by the fingers, and aside from the fact that upon addition of water thereto a return to substantially the form of latex does not occur, the material differs from the ordinary form of coagulum obtained by spontaneous coagulation. Two theories appear as to the actual change which occurs in this spongy mass upon compression. One theory conceives that the mass consists of particles of rubber surrounded by protein masses, which upon compression or rolling are exposed through breaks in the protein envelopes, permitting the particles of rubber to adhere to one another. The other theory assumes that the spongy mass represents rubber in a low state of polymerization, and that compression or rolling results in the appearance of a higher polymerization to produce crude rubber.

The crude rubber thus formed differs from ordinary crude rubber in that under the microscope instead of the somewhat striated structure ordinarily found in crude rubber, formed by the usual process of acetic acid or other coagulation with milling, washing, etc., a globular structure appears. In its chemical constitution it also differs from crude rubber in that it contains a higher percentage of protein matter and in that the character of these components in general is changed. The following approximate analysis of similar rubbers, both obtained from the latex of *Hevea brasiliensis* grown in Sumatra, Dutch East Indies, will serve as a specific example of the differences noted. These differences may vary in accordance with variations in conditions of growth and time of collection of latex, but the table below presented represents a comparison of rubbers obtained from similar latexes:

| Rubbers. | Moisture. | Acetone extract. | Ash. | Water extract. | Protein. | Acidity as acetic acid. |
|---|---|---|---|---|---|---|
| Ordinary milled rubber. | % Under 1 | % 3.0 | % 0.4 | % 0.3 | % 2.0 | % 0.02 |
| Sprayed in air | Under 1 | 5.20 | 1.50 | 7.2 | 4.2 | 0.10 |

It will be observed that the acetone extract, ash, water extract, per cent of protein, are all substantially increased. In this connection it is pointed out that by spraying in accordance with the procedure outlined, a product is obtained in which substantially all of the solid constituents of the latex are preserved, the only loss being the fluid portion which is practically entirely water, and in the case of ammonia treated latex, ammonia is of course lost in the spraying operation. Rubbers obtained from latex by spraying may vary in their moisture content. These rubbers have a neutral or alkaline reaction as opposed to the acid reaction of ordinary crude rubber.

One of the chief differences in the character of sprayed crude rubber when compared with ordinary crude rubber appears upon vulcanization. When the material is milled with sulphur, an increase in tensile strength and resistance to abrasion of approximately 20% occurs. Such increase in tensile strength is shown in connection with the following example of rubber mixes in which the following ingredients were employed:—

*A. Coagulated and milled.*

Rubber, 100 parts.
Zinc oxide, 150 parts.
Sulphur, 10 parts.
Tensile strength, 2000 lbs. per sq. in.
Vulcanization at 40 lbs. steam pressure for two hours.

*B. Sprayed.*

Rubber, 100 parts.
Zinc oxide, 150 parts.
Sulphur, 10 parts.
Tensile strength, 3100 lbs. per sq. in.
Vulcanization at 40 lbs. steam pressure for two hours.

When vulcanizing and compounding ingredients are mixed with latex, preferably in the presence of saponin, and then sprayed, the resistance to abrasion and tensile strength noted above upon comparison with ordinary crude rubber is found to be even more greatly improved than where the vulcanizing and compounding ingredients are introduced, as in the case of the sprayed rubber in the above table, by milling. Such increase is probably due to the absence of such milling operation which tends to break down the rubber as is well known, and also to the increase in the homogeneity of the mass, which is apparent upon examination under the microscope. The presence of the increased quantity of protein in the sprayed rubber aids in accelerating vulcanization whether the vulcanized ingredients be added before or after spraying. It will be observed that various types of vulcanizing ingredients such as sulphur heretofore mentioned, the nitro compounds, sulphur compounds, such as hydrogen sulphide and sulphur dioxide, may be employed in connection with latex, being applied preferably before spraying in order that the homogeneity of the mass may be improved and milling avoided although they may be added at any desired time. As pointed out, other compounding ingredients such as carbon black, gas black, zinc oxide, and other materials, may be added before or after spraying, preferably before spraying. In some cases the latex may be sprayed and the powdered vulcanizing and other compounding ingredients blown separately into the latex spray. The ordinary processes of vulcanization may be employed in connection with the material.

It will be observed that the process set forth is preferably carried out without employment of an artificial coagulant such as acetic acid, alcohol, smoke, or the like, and the product is consequently free from such foreign substances. The avoidance of the addition of a coagulant also reduces the expense of the operation and elimination of the necessity for further moisture removal after spraying makes unnecessary the handling of the rubber and its weakening by milling or heating. The product obtained in accordance with the procedure outlined does away with, among others, the disadvantages of two drying steps in the production of a crude rubber. Further, the product has improved physical characteristics, as has been pointed out. Substantially all of the solid natural constituents of the latex are preserved, and homogeneous mixes are provided even where agents tending to prevent homogeneity are present.

It will thus be seen that among others the objects heretofore enumerated are achieved.

As many apparently widely different embodiments of this invention could be made without departing from the spirit thereof, it will be understood that I do not intend to limit myself to the specific embodiment herein set forth except as indicated in the appended claims.

By latex or similar material as used in the claims is meant the juices of plants producing rubber, balata or gutta percha.

Having thus described my invention, what I claim and desire to protect by Letters Patent is:

1. A crude rubber derived from masses of latex dried in comminuted form and compacted.

2. A crude rubber derived from masses of latex dried while in the form of a spray and compacted.

3. A crude rubber derived from masses of latex dried in the form of a spray and compacted, said crude rubber having a generally globular structure when microscopically examined.

4. A mixture of crude rubber and a vulcanizing agent derived from masses of latex and said agent dried in comminuted form.

5. A mixture of crude rubber and a vulcanizing agent derived from masses of latex and said agent dried in comminuted form and compacted into a coherent mass.

6. A mixture of crude rubber, a vulcanizing agent and a compounding ingredient derived from separate dried masses of latex a vulcanizing agent and compounding ingredient by spraying.

7. A mixture of a crude rubber, a vulcanizing agent, and a compounding ingredient tending to cause coagulation of latex and a protective agent added to the latex and adapted to prevent such coagulation.

8. A mixture of a crude rubber, a vulcanizing agent, a compounding ingredient and a protective agent adapted to prevent coagulation, derived from a mixture of said agent, said compounding ingredient, said protective agent and latex, from which mixture moisture has been removed while in comminuted form.

9. A mixture of a crude rubber, a vulcanizing agent and compounding ingredient tending to cause coagulation of latex, and a protective agent adapted to prevent such coagulation, derived from latex obtained by spraying.

10. A mixture of a crude rubber and sulphur obtained from a mixture of latex and sulphur by spraying, and compacted into a coherent form.

11. A mixture of a crude rubber, sulphur and compounding ingredient adapted to coagulate latex and saponin obtained from a mixture of latex, sulphur, said compounding ingredient and saponin by spraying and compacted into a coherent form.

12. A substantially dry unvulcanized spongy mass of rubber consisting of cohering particles.

13. A substantially dry unvulcanized rubber derived from latex sprayed into a gaseous drying medium.

14. A crude substantially homogeneous rubber derived from latex containing approximately all of the natural constituents of the latex substantially unchanged chemically.

15. A crude rubber derived from latex containing approximately all of the natural constituents of the latex dried in comminuted form and compacted.

16. The herein described product consisting of dried particles of rubber derived from latex sprayed into a gaseous drying medium.

Signed at New York, N. Y., this 15th day of January, 1920.

ERNEST HOPKINSON.